Figure 1:
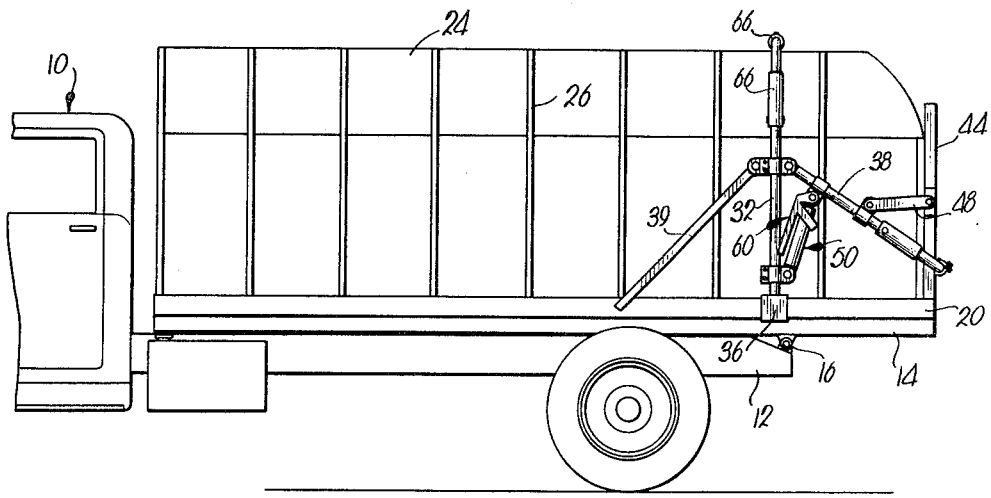

June 7, 1966  F. W. BIRCHMEIER  3,254,919
END GATE FOR FARM DUMP TRUCK
Filed June 15, 1964  2 Sheets-Sheet 1

INVENTOR.
Fred W. Birchmeier
BY
Hovey, Schmidt, Johnson & Hovey.
ATTORNEYS.

June 7, 1966  F. W. BIRCHMEIER  3,254,919
END GATE FOR FARM DUMP TRUCK
Filed June 15, 1964  2 Sheets-Sheet 2
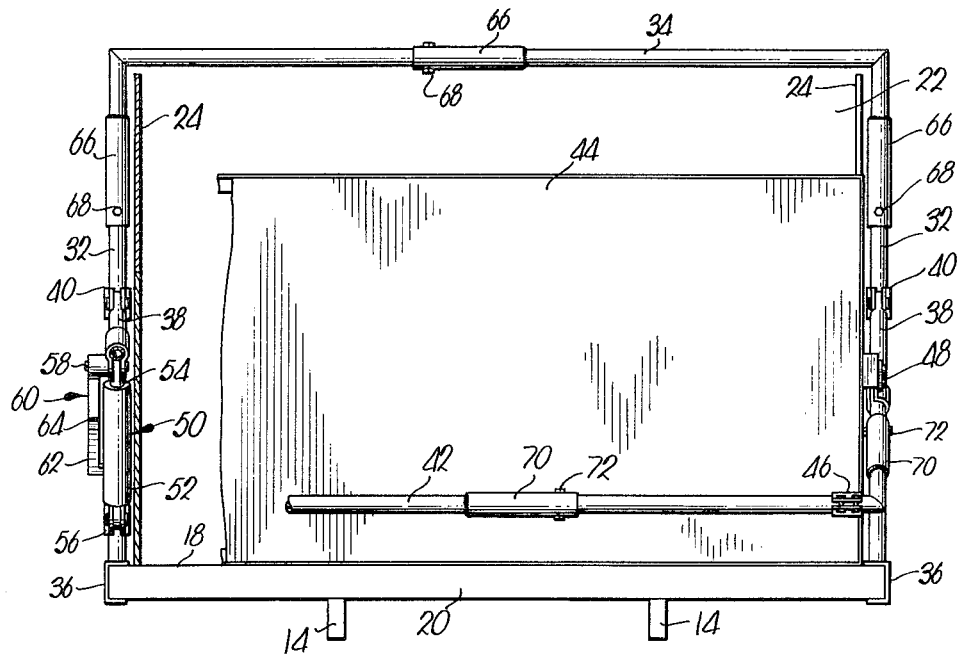
Fig.3.
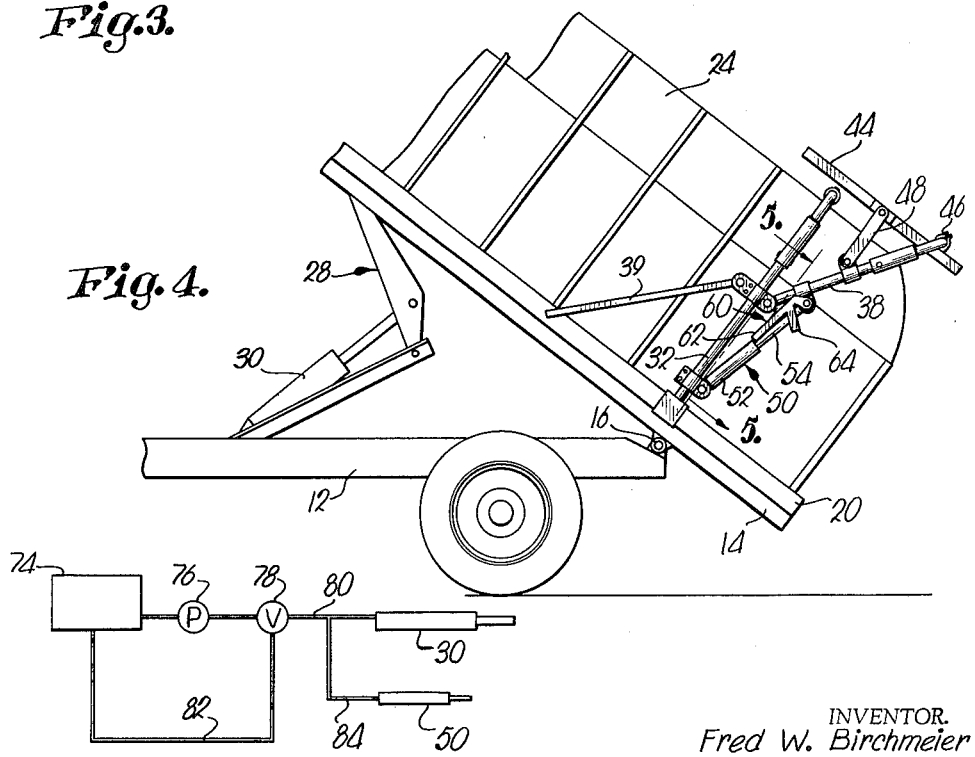
Fig.4.
Fig.6.
INVENTOR.
Fred W. Birchmeier
BY
Hovey, Schmidt, Johnson & Hovey.
ATTORNEYS.

United States Patent Office 3,254,919
Patented June 7, 1966

3,254,919
END GATE FOR FARM DUMP TRUCK
Fred W. Birchmeier, R.R. 5, Emporia, Kans.
Filed June 15, 1964, Ser. No. 374,914
3 Claims. (Cl. 298—23)

This invention relates to an operating mechanism for the end gate of a farm dump truck and, more specifically, to means for automatically opening and closing the gate in response to movement of the dump bed between its load-hauling position and the dumping position thereof.

End gates in present use on farm dump trucks are generally quite crude in construction and are subject to damage and extreme wear. Ordinarily, the gate is hinged from the top and swings open under the force of the load as the truck bed tilts to the dumping position. Thus, a gate of this type is not positive in operation, tends to impede the flow of the loaded material out of the truck bed, and requires the use of pins or other devices to maintain the gate shut when the bed is down and the truck is hauling a load from place to place.

In such prior art arrangements it is necessary for the driver of the truck to leave the cab of the vehicle and unlock the gate prior to operating the bed-tilting mechanism. Thus, the driver is forced to leave the cab and return twice in order to dump a load—first, to unlock the gate and, secondly, to secure the gate once again after the load has been dumped. Manifestly, this results in a great loss of time, especially when frequent runs are being made from the field to the dumping site.

West of the Mississippi River, pit or trench silos are frequently employed to store ensilage or other feeds. A pit silo, unlike an upright silo, is open and uncovered. In the hauling of cut ensilage, for instance, from the field to a pit silo, the dump truck is driven onto the base or floor of the silo (usually a concrete slab) and the dumping operation effected. The truck then returns to the field for another load, leaving the previous load in a pile in the silo for movement into the main stack by a wheeled or tracked vehicle equipped with a bulldozer blade. It is evident that the number of loads that could be delivered during a given period of time would be greatly increased if the truck driver did not have to manipulate the end gate as discussed above.

It is, therefore, the primary object of this invention to provide an end gate for a farm dump truck that will open and close automatically when the truck bed is operated without requiring that the driver leave the cab of the truck.

Another important object of this invention is to provide an end gate as aforesaid that will not impede the flow of the loaded material from the truck bed to the ground during the dumping operation.

Still another important object of the instant invention is to provide such an end gate that will not drag through the load during opening thereof prior to the dumping operation. It is noteworthy that some gates utilized heretofore slide vertically upwardly and downwardly, thus rendering the same difficult to operate when a full load is in the bed due to the rearward force exerted on the gate by the load.

It is still another important object of this invention to provide end gate structure operable by the hydraulic system of the bed-tilting mechanism of the truck which will automatically lock the gate in its open position if the pressure in the hydraulic system should fall or fluctuate during the dumping operation.

A further object of this invention is to provide locking means as aforesaid which will automatically release the gate as the bed returns to its normal position to thereby permit the gate to subsequently close.

Yet another object of the instant invention is to provide an end gate assembly as aforesaid which is adapted to fit trucks of various sizes.

Other objects will become apparent as the detailed description proceeds.

Figure 2:
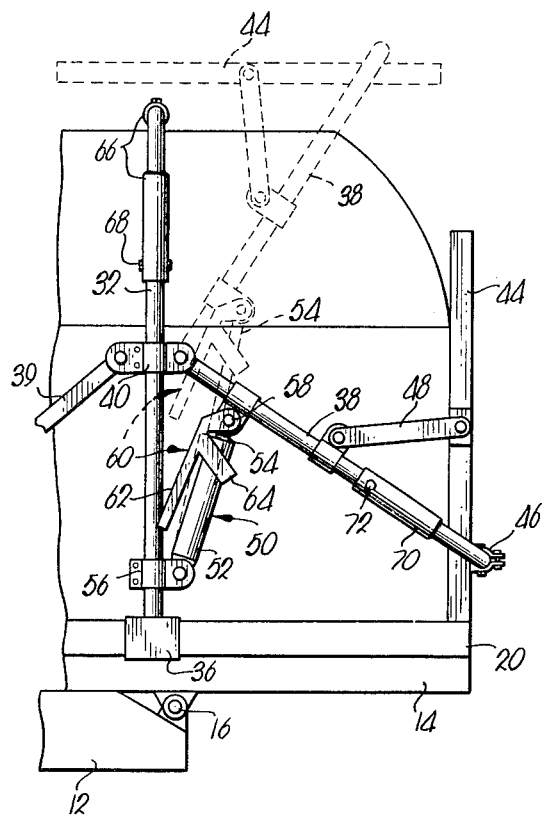
Figure 5:
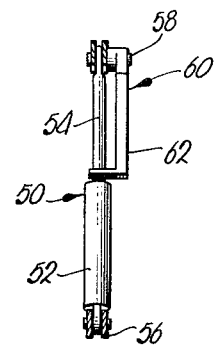

In the drawings:
FIGURE 1 is a side elevational view of a farm dump truck showing the apparatus of the instant invention mounted thereon;
FIG. 2 is a fragmentary, enlarged, side elevational view showing the gate apparatus in detail;
FIG. 3 is a fragmentary, enlarged, rear elevational view of the truck and the gate apparatus;
FIG. 4 is a fragmentary, side elevational view showing the gate in the open position with the bed raised to the dumping disposition;
FIG. 5 is a fragmentary, enlarged, sectional view taken along line 5—5 of FIG. 4; and
FIG. 6 is a schematic diagram of the hydraulic system for operating the bed and the gate.

The numeral 10 denotes a farm dump truck of a conventional type having a frame 12 upon which a bed undercarriage comprising a pair of members 14 normally rests. The undercarriage 14 is attached to frame 12 by hinge 16. The bed 18 of the truck is secured to undercarriage 14 and overlies the same, bed 18 including a rectangular bedframe 20 surrounding the periphery thereof and rigidly attached to undercarriage 14.

A front wall 22 and a pair of side walls 24 extend upwardly from bed 18, the side walls being vertically ribbed as at 26 for purposes of reinforcement. The bed 18 and its associated structure are also connected with the truck frame 12 by a conventional hoist or tilting mechanism 28 which includes a hydraulic piston and cylinder assembly 30 for operating the bed. This is clearly shown in FIG. 4.

The apparatus of the instant invention includes a pair of uprights 32 interconnected by an overhead, horizontal cross brace 34. Each of the uprights 32 is provided with a U-shaped support bracket 36 at the lower extremity thereof, such bracket being adapted to receive the bedframe 20 and attach the corresponding upright thereto. Brackets 36 may be secured to frame 20 by any suitable means, such as through the use of bolts or by a welded joint.

A pair of rearwardly extending arms 38 and a pair of forwardly extending braces 39 are swingably mounted on corresponding uprights 32 by mounting brackets 40, each of these brackets 40 comprising a combination clamp and double clevis arrangement which allows the bracket to be shifted longitudinally along upright 32 to a desired position and clamped in place. The rearward extremities of arms 38 are interconnected by a crossbar 42, an end gate 44 being rigidly secured to the ends of the crossbar by clamps 46. Gate 44 is also secured to the arms 38 by a pair of links 48, each of the latter being coupled with the respective arm intermediate the ends thereof. The forward extremities of braces 39 are welded or bolted to frame 20.

A hydraulic piston and cylinder assembly 50, including a cylinder 52 and a piston rod 54, is attached between one of the uprights 32 and the corresponding arm 38 for opening and closing gate 44. As may be seen particularly in FIGS. 2 and 5, another combination clamp and clevis mounting bracket 56 is employed to pivotally secure the lower extremity of cylinder 52 to upright 32, the upper end of piston rod 54 being pivotally attached to arm 38 by a hinge pin 58.

A locking device 60 is also swingably mounted to the arm 38 on the left side of truck 10 by hinge pin 58, device 60 including an L-shaped locking element 62 and a counterweight 64. When gate 44 is closed, as illustrated by full lines in FIGS. 1 and 2, element 62 hangs from hinge pin 58 in spaced relationship to cylinder 52. However, upon movement of gate 44 to the open position and actuation of the bed-tilting mechanism 28, as shown in FIG. 4, element 62 swings into engagement with piston rod 54 adjacent the upper extremity of cylinder 52 as is clearly illustrated in FIGS. 4 and 5.

Uprights 32, arms 38, cross brace 34, and crossbar 42 are illustrated in the drawings as being of steel pipe construction. The uprights 32 and cross brace 34 are constructed of two straight lengths of steel pipe and two L-shaped pipe sections, all interconnected by enlarged sleeves 66 provided with crossbolts 68. This is especially clear in FIG. 3 where it may be seen that each of the two L-shaped sections comprises approximately half the length of cross brace 34 and the upper portion of the corresponding upright 32.

Sleeves 66 permit telescoping of the pipes therewithin so that the vertical and horizontal dimensions of the uprights and the cross brace may be varied to accommodate trucks of different sizes. A series of spaced holes (not shown) through the walls of the pipes adjacent the sleeves 66 permit the crossbolts 68 to be passed therethrough to secure the various pipes together into a rigid unit after adjustment of the size is effected. Additionally, arms 38 and crossbar 42 are formed of two straight lengths of pipe and one U-shaped pipe section interconnected by sleeves 70 and crossbolts 72 in an analogous manner as described above. Thus, the front-to-back dimension of the gate assembly and the distance between arms 38 may also be adjusted.

FIG. 6 illustrates a simple, conventional hydraulic system normally utilized to operate only the bed piston and cylinder assembly 30. The system includes an oil reservoir 74, a pump 76, and a valve 78 operable from the cab of the truck to direct hydraulic fluid either into the supply line 80 to cylinder assembly 30 or, alternatively, from supply line 80 back through return line 82 to reservoir 74. In the instant invention, the gate piston and cylinder assembly 50 is intercoupled with supply line 80 by an auxiliary line 84.

In operation, valve 78 will normally be positioned so that supply line 80 is communicated with return line 82 rather than the pump 76. Thus, neither of the hydraulic piston and cylinder assemblies will be actuated. However, when it is desired to tilt the bed and dump the load, valve 78 is manipulated by the driver to direct oil under pressure through lines 80 and 84 to the assemblies 30 and 50.

It is evident that a hydraulic cylinder of much larger capacity will be required to raise the loaded bed to its dumping position. Furthermore, the pressure developed in the hydraulic line must reach a certain minimum value before assembly 30 will commence operation of mechanism 28 and begin upward movement of the bed. During this period of pressure buildup, however, piston rod 54 of assembly 50 will extend to its maximum position since the weight of end gate 44 is quite small relative to the loaded bed. The cumulative effect is to cause complete opening of end gate 44 prior to any upward movement of the truck bed.

It is apparent that the connection of cylinder assembly 50 with the same line (80) that feeds the bed-actuating cylinder assembly 30 creates a hydraulic actuating system having a slow response branch and a high response branch, the former being associated with the truck bed while the latter is utilized to shift the end gate 44. After the end gate is moved to the position illustrated by the broken lines in FIG. 2, continued pressure buildup in the slow response branch of the system actuates bed-tilting mechanism 28 and causes the bed to move toward its dumping position, illustrated in FIG. 4. As this bed movement occurs, the load on the bed begins to gradually shift rearwardly. Finally, as mechanism 28 approaches maximum extension, the load will shift suddenly rearwardly, thereby moving the bed to its maximum dumping position. During this time, of course, some of the load has already poured from the bed but, nonetheless, a sudden surge will occur at a critical point in the path of travel of the rising bed.

Sudden shifting of the load as justt described often causes a momentary pressure loss in the hydraulic system since the piston and piston rod of the bed-actuating cylinder assembly 30 is suddenly shifted to its maximum extended position by means other than the hydraulic fluid in the cylinder. Manifestly, this pressure drop will be communicated to the cylinder 52 of the gate cylinder assembly 50, also causing a pressure drop therein. However, this pressure drop in assembly 50 will cause retraction of piston rod 54 under the weight of the open gate 44, thereby resulting in partial closure of the gate unless some means is provided to prevent this action.

In the instant invention, the locking device 60 serves to prevent gate closure by such pressure drops or other fluctuations in the pressure in the hydraulic system. Referring first to FIG. 2, it may be seen that device 60 does not substantially shift relative to cylinder 52 as the gate is moved from the closed position to the open position. A comparison of FIGS. 2 and 4, however, reveals that device 60 swings under the influence of gravity as the bed rises. More specifically, referring particularly to FIGS. 4 and 5, it may be seen that the L-shaped element 62 moves into engagement with rod 54 as the bed rises toward dumping position. This engagement is maintained by the influence of counterweight 64. Thus, when the pressure in the hydraulic system drops, the lower extremity of element 62 comes to rest on the upper end of cylinder 52 and gate 44 is positively prevented from closing. It should be noted that assembly 50 and locking device 60 are dimensioned such that slight clearance is left between the lower extremity of element 62 and the upper end of cylinder 52 so that the movement of device 60 will not be obstructed. Therefore, gate 44 may move slightly when pressure drops in the hydraulic system (a sufficient distance to bring element 62 and cylinder 52 into engagement) but such movement will be negligible.

After dumping is completed, the driver operates valve 78 to communicate supply line 80 with return line 82 to permit the fluid to drain from the hydraulic cylinders. Thus, the bed gradually settles back to its normal position while gate 44 remains completely open since the pressure in the system still greatly exceeds that necessary to maintain the gate in the raised or open position. After the bed returns to normal, gate 44 will close gradually against the fluid cushion in cylinder 52. Therefore, the entire dumping operation is performed without the driver leaving the cab of the truck.

It is noteworthy that gate 44 moves along an arcuate path of travel as the same is raised from its closed to its open position. In so doing, the gate actually moves rearwardly or away from the load on the bed. Therefore, the gate is not forced to move through the load against the resistance thereof but, instead, it follows a path of travel which is entirely free of drag. This is highly advantageous since positive operation of the gate is assured and excessive strain thereon, which could cause damage to the gate assembly, is prevented.

Having thus described the invention, what is claimed as new and desired to be secured by Letters Patent is:

1. Apparatus for use with a farm dump truck having a bed-tilting mechanism operated by a fluid pressure system, said apparatus comprising:

an end gate for said truck;

structure for mounting the gate on the truck for swinging movement about a normally horizontal axis between a normal, closed position and an operated, open position above the bed, said structure including a fluid pressure operated piston and cylinder assembly coupled with said gate for operating the latter;

fluid coupling means for communicating said assembly with said fluid pressure system of the truck, whereby to automatically open the gate when the bed-tilting mechanism is actuated; and means coupled with said gate for automatically locking the latter in said open position when the bed of the truck moves to its dumping disposition, whereby to prevent closure of the gate during fluid pressure fluctuations as the load is dumped from the bed, said locking means including a shiftable element movable between a position releasing the gate, when the bed is in its load-hauling disposition, and a position for locking the gate when the bed is in said dumping disposition, said locking means including means mounting said element for gravitational movement between said positions thereof.

2. The invention of claim 1, wherein said structure includes an arm rigid with the gate and swingable about said axis, said assembly being disposed below said arm and having a piston rod extending upwardly from the cylinder, there being means pivotally joining the rod and said element to the arm with the element disposed for gravitational movement into abutting relationship with the rod adjacent the cylinder when said rod is extended by pressure in the cylinder and the bed moves to said dumping disposition whereby, when the truck is dumping, said element rests on the cylinder upon slight downward movement of the gate during drops in fluid pressure.

3. The invention of claim 1, wherein said structure includes a pair of longitudinally extensible and retractable uprights adapted for attachment to opposed sides of said bed, and an elongated, longitudinally extensible and retractable arm swingably mounted to each upright respectively and rigidly secured to said gate, and means releasably maintaining the uprights and arms at preselected longitudinally extended lengths, whereby the structure may be adjusted to accommodate trucks of various sizes.

References Cited by the Examiner
UNITED STATES PATENTS

| | | | |
|---|---|---|---|
| 1,961,193 | 6/1934 | Brumbaugh | 298—23 X |
| 2,407,012 | 9/1946 | Hutchinson | 298—117 |
| 2,831,727 | 4/1958 | Wilkinson | 298—23 X |

BENJAMIN HERSH, *Primary Examiner.*

R. J. JOHNSON, *Assistant Examiner.*